F. B. ALMY.
AUTOMOBILE TOP.
APPLICATION FILED APR. 3, 1920.
1,403,664.
Patented Jan. 17, 1922.
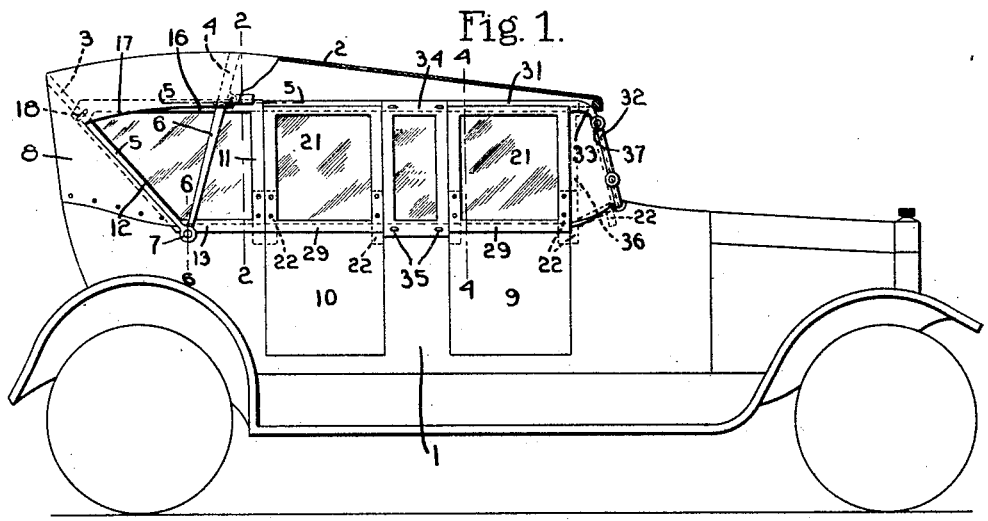
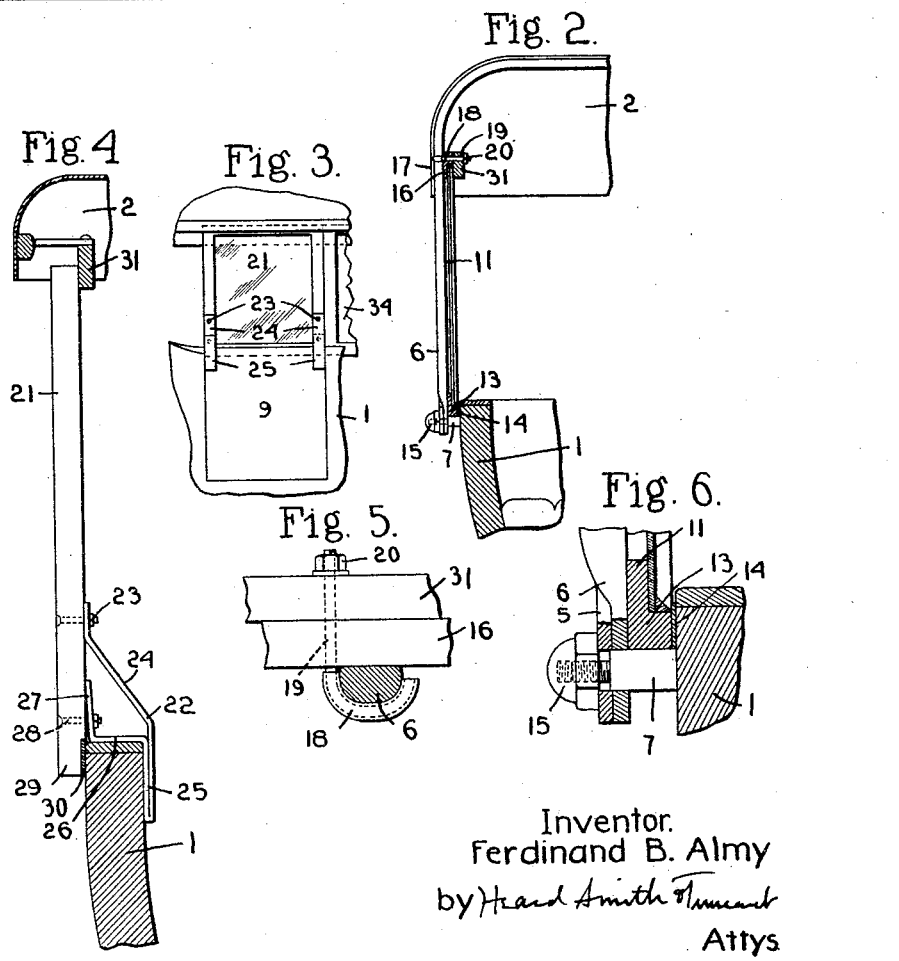
Inventor.
Ferdinand B. Almy
by Heard Smith Truman
Attys

UNITED STATES PATENT OFFICE.

FERDINAND B. ALMY, OF MELROSE, MASSACHUSETTS.

AUTOMOBILE TOP.

1,403,664.

Specification of Letters Patent.   Patented Jan. 17, 1922.

Application filed April 3, 1920.   Serial No. 371,108.

*To all whom it may concern:*

Be it known that I, FERDINAND B. ALMY, a citizen of the United States, residing at Melrose, county of Middlesex, State of Massachusetts, have invented an Improvement in Automobile Tops, of which the following description, in connection with the accompanying drawing, is a specification, like characters on the drawing representing like parts.

This invention relates to automobile tops of the folding or canopy type, and has for its principal object to provide improved glass sides for the automobile top which can be readily put in place or removed, and which when in place give the car an appearance quite similar to that of a closed car, and produce a top which is as comfortable for the occupants as an ordinary closed car.

Another object of the invention is to provide improved glass sides for a folding automobile top which can be quickly put in place or removed, and which can be applied to the automobile without making any alterations in either the body or in the canopy top.

In order to give an understanding of my invention, I have illustrated in the drawings a selected embodiment thereof which will now be described, after which the novel features will be pointed out in the appended claims.

In the drawings, Fig. 1 is a side view of an automobile embodying my invention;

Fig. 2 is a section on the line 2—2, Fig. 1;

Fig. 3 is an inside view of the door with the glass window attached thereto;

Fig. 4 is an enlarged section on the line 4—4, Fig. 1;

Fig. 5 is an enlarged section on the line 5—5, Fig. 1;

Fig. 6 is an enlarged section on the line 6—6, Fig. 1.

In the drawings, 1 indicates an automobile of the touring car variety, it having front and rear doors 9 and 10 and also having the usual folding or canopy top 2 which is provided with bows, two of which at the rear portion are indicated at 3 and 4. These bows 3 and 4 have the usual bow arms 5 and 6 which are pivoted on a stud 7 extending laterally from the automobole body 1. In the top herein shown, the rear portion 8 thereof extends around the side of the automobile 1 to the rear bow arm 5, this being a common expedient in the construction of canopy tops for automobiles.

The parts thus far described are or may be all as usual in automobiles having canopy tops and form no part of my present invention, which relates to a novel construction of glass sides for the automobile top to take the place of the usual curtains.

In accordance with my invention I provide a pair of glass panels or sashes which can be readily secured to the bow arms 5 and 6 for filling the space between the rear door and the rear portion 8 of the top, a sash adapted to be secured to each door for filling the space directly above the door, and other sashes which are constructed to fill the space between the door sashes. All of these sashes are separate from each other and may be installed separately, or they may be all installed, thus making a closed car. Further, each sash can be secured in position without making any change in the car structure and without marring or injuring the car in any way.

The window sash which is situated at the rear of the rear door 10 is indicated at 11 and it will have an appropriate shape to fill the space at the side from the rear edge of the door 10 to the rear portion 8 of the top. In the construction shown where the rear portion 8 of the top comes forwardly to the bow arm 5, the window sash 11 will have the rear side 12 thereof inclined to correspond to the inclination of the bow arm 5. This window sash 11 is situated inside of the bow arms 5, 6, and the lower rail 13 thereof rests on the stud 7, as shown in Fig. 2, and is confined between the side of the automobile body and the lower ends of the bow arms 5 and 6. I will preferably place a strip 14 of felt or other similar material between the lower rail 13 of the window sash and the automobile body to prevent the latter from becoming scratched or injured.

The stud 7 is usually shouldered, as indicated in Fig. 6, and the bow arms are held in place thereon by a cap nut 15 which screws up against the shoulder. The thickness of the lower rail 13 of the sash is such that when it is introduced between the bow arms and the automobile body 1, the tightening of the cap nut 15 will cause the sash to be firmly clamped between the bow arms and the automobile body before the cap nut engages the shoulder of the stud 7. When the window sash is in place, it will be firmly and rigidly held to the automobile body by the cap nut 15.

The upper rail 16 of the window sash 11 is situated just above and within the lower edge 17 of the canopy top, and it lies against the bow arms 5 and 6. The upper end of the window sash is rigidly clamped to the bow arms by some suitable clamping device. A simple device is shown in Fig. 5 and comprises a hook-shaped element 18 which embraces the bow arm and has a screw-threaded shank 19 extending through the upper rail of the window sash, said shank having a clamping nut 20 thereon by which the sash is clamped to the bow arm. With the above construction each rear window sash 11 will be firmly and rigidly clamped in position in such a way that there will be no rattling noise developed because of loose parts. Further, the application of the window sash to the automobile top requires no change or alteration in the top and involves merely removing or loosening the cap nut 15 sufficiently to permit the lower rail of the window sash to be inserted between the side of the automobile and the lower end of the bow arms. The tightening of the cap nut 15 and the adjustment of the clamps 18 are all that is necessary to firmly secure the window sash in place.

I have also provided a novel and simple window sash construction to fill the space directly above each of the doors 9 and 10. Each of these window sashes is indicated generally at 21, and each window sash 21 is detachably but firmly secured to one of the doors. For this purpose, each window sash 21 is provided with two clamping members which are adapted to be clamped to the upper edge of the door. Each clamping member comprises a strip of metal 22 bent to the shape shown in Fig. 4, that is, one end of the metal strip is secured to the window sash by a suitable bolt 23, and then is bent outwardly therefrom, as at 24, and then bent downwardly and back on itself to form the finger or projection 25. The strip is then bent laterally at 26 and upwardly at 27 to overlie the inner face of the sash 21. The portion 27 is secured to the window sash by a clamping bolt 28. The length of the portion 26 is slightly less than the thickness of the door.

The window sash is secured in place by placing the lower rail 29 thereof on the outside of the door at the top with the fingers 25 on the inside of the door so that the upper edge of the door is clamped between the lower rail 29 and the fingers 25. A suitable piece of felt or packing material 30 will preferably be employed between the window sash and the outside of the door to prevent marring the automobile paint.

After the window is in place the clamping bolt 28 is tightened and because the portion 26 is slightly less than the thickness of the door, such tightening will firmly clamp the door between the lower rail 29 and the fingers 25, thus firmly and rigidly holding the window sash in place.

In order to provide a firm support for the upper edge of each sash 21 when the door is closed, I propose to employ at each side of the car a longitudinally-extending stringer or member 31 which is secured at its rear end to the upper end of the sash 11 and at its front end may be secured to the wind shield post 32. This stringer may be in the form of a strip of wood of the proper length which has at its front edge a bracket 33 adapted to be attached to the wind shield post in any suitable way. One convenient method would be to provide the bracket with an aperture to fit over the pivot bolt which is used for pivoting the upper section of the wind shield and to employ the usual clamping nut 37 for holding the bracket on this pivot bolt. This stringer 31 is so situated that when the doors are closed the upper ends of the sashes 21 will lie against the outer face thereof, as shown in Fig. 4. This stringer may conveniently be provided on its outer face with a strip or felt to prevent any rattling noise.

The space between the door sashes 21 on each side will preferably be filled with a sash panel 34 which may be attached at its upper end to the stringer 31 by means of bolts and at its lower end may be attached to the automobile body by the usual fasteners 35 by which the lower edge of the curtain is fastened.

For filling the space between the front edge of the front door sash and the wind shield, I may if desired provide a special sash 36 which is shown in dotted lines, Fig. 1, and which will be appropriately shaped for this purpose. The upper edge of this sash will rest against and may be secured to the stringer 31, and the lower edge of the sash will be held in place by clamping fingers 22 similar to those used on the door sashes, such clamping members fitting over the edge of the body directly in front of the door. If desired also this sash 36 may be constructed to be attached to the wind shield post.

One of the advantages resulting from my construction is that it can be applied to any automobile having a canopy top without making any change or alteration in the automobile or in the top.

Another advantage is that since there is an independent sash for each door and another separate sash for the space in the rear of the rear door, it is possible to equip the car with one or more of the sashes, depending on the degree of protection desired by the occupants. Under some circumstances it may be sufficient to have the window sash 11 only in place. Under other circumstances, one or more of the window sashes 21 may be desirable, but any one of the window sashes can be put in place just about as quickly as an ordinary side curtain can be attached.

While I have illustrated herein a selected embodiment of my invention, I do not wish to be limited to the constructional details shown.

I claim:

1. In an automobile having a body provided with a door and a folding top, the latter having the usual bow arms, the combination with said top, of a window sash situated entirely inside of the bow arms, and extending from the rear of the top to the door, the lower edge of said sash being situated between the body and the bow arms and being rigidly clamped to the body by the bow arms, and means to connect the upper edge of said sash rigidly to the bow arms.

2. In an automobile, the combination with a body having doors and a stud projecting from each side in the rear of the doors, of a folding top having the usual bow arms pivotally mounted on said studs, a window sash situated inside of the bow arms on each side and extending from the door to the rear of the top, the lower edge of each sash resting on the stud and situated between the bow arms and the side of the automobile, a clamping nut on each stud by which the sash is clamped between the bow arms and the side of the automobile body, and means to clamp the upper edge of each sash rigidly to the bow arms.

3. In an automobile, the combination with a body having doors and a folding top, of a window sash for each door, each sash having its lower edge overlying the outside of the upper portion of the door, resilient clamping arms secured to the inside of each sash and engaging the inside of the door, and means to draw the arms of each sash toward the door whereby the door is clamped between the lower edge of the sash and the arms and said sash is thereby firmly secured to the door.

4. In an automobile, the combination with a body having doors and a folding top provided with bows, said body having studs extending therefrom to which the bows are pivoted, a nut on each stud to retain the bows thereon, a window sash at each side of the automobile situated inside of the bows and resting on said studs, the lower edges of said sashes being clamped between the bow arms and the automobile body by said nut, means connecting the upper edge of each sash to the bows, a stringer connected at its rear end to the upper end of each sash and at its upper end to the windshield post, and window sashes frictionally clamped to the upper edge of each door and movable therewith, the upper edges of said sashes engaging said stringers when the doors are closed.

In testimony whereof, I have signed my name to this specification.

FERDINAND B. ALMY.